US006709612B2

(12) United States Patent
Martino

(10) Patent No.: US 6,709,612 B2
(45) Date of Patent: Mar. 23, 2004

(54) REFORMED MEDIUM DENSITY FIBER BOARD PRODUCTS, SUCH AS DOOR SKINS, AND A PROCESS FOR REFORMING MEDIUM DENSITY FIBER BOARD

(75) Inventor: Ralph A. Martino, Tampa, FL (US)

(73) Assignee: MDF, Inc., Tampa, FL (US)

( * ) Notice: Subject to any disclaimer, the term of this patent is extended or adjusted under 35 U.S.C. 154(b) by 0 days.

(21) Appl. No.: 10/032,716

(22) Filed: Jan. 2, 2002

(65) Prior Publication Data

US 2002/0090500 A1 Jul. 11, 2002

Related U.S. Application Data

(62) Division of application No. 09/243,464, filed on Feb. 3, 1999, now Pat. No. 6,335,082.

(51) Int. Cl.[7] .......... B32B 27/00
(52) U.S. Cl. .......... 264/112; 264/119
(58) Field of Search .......... 264/112, 119

(56) References Cited

U.S. PATENT DOCUMENTS 5,183,622 A * 2/1993 Persson .......... 264/320
5,391,340 A * 2/1995 Mirous et al. .......... 264/112

* cited by examiner

*Primary Examiner*—Elizabeth M. Cole
(74) *Attorney, Agent, or Firm*—Liniak, Berenato & White, LLC

(57) ABSTRACT

To produce a reformed medium density fiber (MDF) product, a reforming process is performed on a pre-finished MDF board having at least one pre-finished surface which, in turn, carries at least one coating. The process comprises the steps of: placing the pre-finished medium density fiber board in a heated press mold; closing the heated press mold while the pre-finished medium density fiber board is located therein; applying pressure and heat to the pre-finished medium density fiber board using the heated press mold so that the pre-finished surface(s) is (are) reformed without cracking, bubbling, or removal of the coating(s); opening the heated press mold; and removing the pre-finished medium density fiber board from the heated press mold. The application of pressure and heat preferably is such that the board becomes reformed, preferably no greater than 0.045 inch into the board. The press mold preferably is heated to a temperature sufficient to soften resin in the coating(s) and/or board, so that fibers in the resin tend to flow rather than break during reforming of the pre-finished surface, and is sufficiently low to prevent discoloration of the coating(s) and sticking of the coating(s) to the heated press mold. The process is particularly well-suited for use in making reformed door skins inexpensively from flat, pre-finished MDF boards. In this regard, the reforming preferably provides simulated door panels and simulated wood grain texture. A pre-finishing process and product produced thereby also are provided.

27 Claims, 2 Drawing Sheets

REFORMED MEDIUM DENSITY FIBER BOARD PRODUCTS, SUCH AS DOOR SKINS, AND A PROCESS FOR REFORMING MEDIUM DENSITY FIBER BOARD

This application is a division of Ser. No. 09/243,464 filed Feb. 3, 1999, now U.S. Pat. No. 6,335,082.

BACKGROUND OF THE INVENTION

The present invention relates to a reformed medium density fiber (MDF) board product, such as a door skin, and a process for reforming an MDF board to provide such a product.

There are several known techniques for manufacturing composite, hollow-core doors with ornamental features such as simulated panels and simulated wood grain. Some of these techniques involve the molding of MDF boards to create door skins. Such door skins are subsequently finished using primers, pigments, and the like, to provide a finished door skin. The finished door skins then are secured to opposing sides of a support frame to define a hollow-core door.

While such conventional techniques can provide fairly realistic simulations of paneled wood doors, they typically involve the use of a purchased door skin that is relatively expensive because it is produced through use of a complicated capital-intensive molding process. Masonite Corporation, for example, produces molded door skins by pressing a relatively thick fiber matt into a door skin having the requisite panels. The molded door skin provides contouring at depths close to or matching the depth typically found in an actual paneled door. The molds which provide such contouring, however, are complex and very expensive. Such molding processes also require an excessive amount of time and energy. As a result, the conventional simulated panel wood doors are rather expensive. Typically, they are too expensive for use in low-cost housing projects and the manufactured home industry. Since most buildings have multiple doors, the expense associated with providing conventional simulated paneled doors in a particular building is multiplied by the number of doors in that building. As a result, the aesthetic benefits derived from simulated paneled wood doors are seldom enjoyed by purchasers or occupants of low-cost housing, office trailers, manufactured buildings, and the like.

There is consequently a need in the art for a process of manufacturing a door skin with ornamental features, such as simulated wood panels and simulated wood grain texturing, using relatively simple, quick, and inexpensive molding techniques and equipment.

There is also a need for a process of molding flat MDF boards after finishing, without damaging the coating(s) on the finished product or cracking the MDF board and/or the fibers contained therein. Certain conveniences and manufacturing efficiencies could be realized if flat MDF boards could be finished prior to molding. This, for example, would allow the finishing coats to be applied using roll coating and other application techniques, which are best suited for use on flat surfaces. In addition, it would permit the stocking of finished flat MDF boards in inventory, and the molding of such flat boards after orders are received without having to carry out a subsequent finishing process.

There have been efforts in the prior art to deform flat MDF board, but those efforts have not yet produced a commercially suitable product. The efforts frequently result in a commercially unsuitable surface due to breaking of the fiber in the board, thus providing a surface that is not suitable for being finished. No efforts to deform a “finished” MDF board are known.

SUMMARY OF THE INVENTION

It is a primary object of the present invention to overcome the problems associated with conventional molding techniques by providing, among other things, a process for reforming a pre-finished medium density fiber (MDF) board having at least one pre-finished surface which carries at least one coating.

Another object of the present invention is to provide a process of manufacturing a door skin with ornamental features, such as simulated wood panels and simulated wood grain texturing, using relatively simple, quick, and inexpensive molding techniques and equipment.

Yet another object of the present invention is to provide a process of molding flat MDF boards after finishing, without damaging the coating(s) on the finished product or cracking the MDF board and/or the fibers contained therein.

Still another object of the present invention is to provide a medium density fiber (MDF) board product comprising a pre-finished medium density fiber (MDF) board having at least one pre-finished surface which carries at least one coating, wherein the pre-finished surface(s) and the coating (s) are press-molded to provide a relief feature after application of the coating(s).

To achieve these and other objects, the present invention provides a process for reforming a planar pre-finished medium density fiber (MDF) board having at least one pre-finished surface which carries at least one coating. The process comprises the steps of placing the planar pre-finished medium density fiber board in a heated press mold; closing the heated press mold while the pre-finished medium density fiber board is located therein; applying pressure and heat to the pre-finished medium density fiber board using the heated press mold so that the pre-finished surface(s) is (are) reformed without cracking, bubbling, or removal of the coating(s); opening the heated press mold; and removing the pre-finished medium density fiber board from the heated press mold.

The present invention also provides a medium density fiber (MDF) board product comprising a pre-finished medium density fiber (MDF) board having at least one pre-finished surface which carries at least one coating. The pre-finished surface(s) and coating(s) on the board are press-molded to provide a reformed feature therein after application of the coating(s).

Also provided by the present invention is a process for making a pre-finished medium density fiber (MDF) board which is reformable after finishing, the process comprises the steps of applying at least one pigment layer to at least one major surface of a planar raw medium density fiber board, and applying at least one polymer top layer over the pigment layer(s). The polymer top layer(s) has (have) a release agent which prevents the polymer top layer(s) from adhering to the heated press mold during press molding. The pigment layer (s) and polymer top layer(s) are applied using materials and thicknesses thereof which are capable of withstanding press-molding at temperatures and pressures sufficient to reform the pigment layer(s) and the polymer layer(s), without cracking, bubbling, and adherence to a press mold.

The above and other objects and advantages will become more readily apparent when reference is made to the following description taken in conjunction with the accompanying drawings.

DESCRIPTION OF THE PREFERRED EMBODIMENTS

Figure 1:
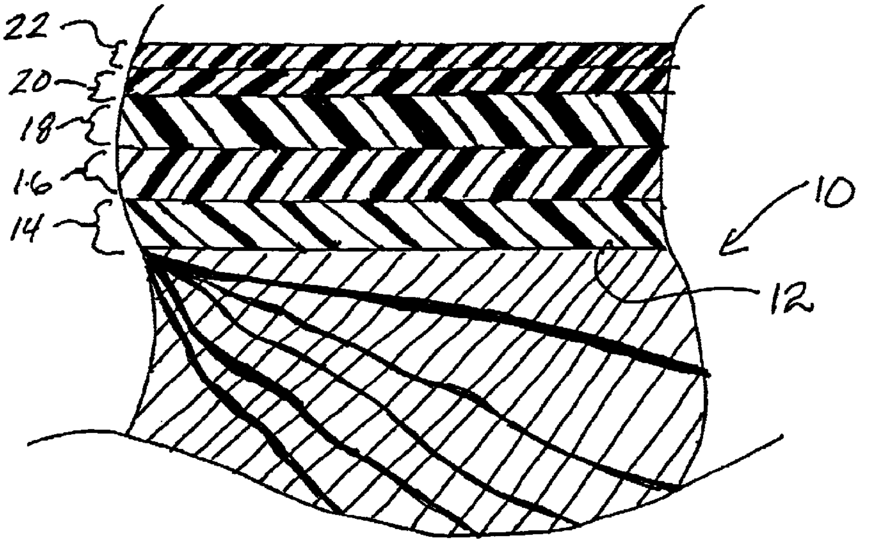
FIG. 1 is a fragmentary cross-sectional view of a pre-finished MDF board according to a preferred implementation of the present invention, prior to reformation.

According to the present invention, a reforming process is performed on a pre-finished medium density fiber (MDF) board having at least one pre-finished surface which, in turn, carries at least one coating.

The process comprises the steps of: placing a pre-finished medium density fiber board planar blank in a heated press mold; closing the heated press mold while the pre-finished medium density fiber board blank is located therein; applying pressure and heat to the pre-finished medium density fiber board blank using the heated press mold so that the pre-finished surface(s) is (are) altered into three dimensional form without cracking, bubbling, or removal of the coating (s); opening the heated press mold; and removing the pre-finished medium density fiber board from the heated press mold.

The heated press mold preferably has at least one relief surface and the step of applying pressure and heat is performed so that the relief surface reforms at least the pre-finished surface of the pre-finished MDF board. In order to avoid cracking, bubbling, or removal of the coating(s), the relief surface is configured and the step of applying pressure and heat is performed so that reforming of the pre-finished surface(s) extends only a relatively short distance into the MDF board, preferably no greater than about 0.045 inch. Such shallow reforming of the pre-finished MDF board also avoids cracking of the fibers contained in the MDF board, which might otherwise occur when deeper reforming techniques and relief surfaces are used. Additionally, because the coat preferably is polymerizable through application of heat to a relatively hard surface, the reformed blank, when removed from the mold, has a surface resistant to being marred.

Since MDF boards tend to dry out during the application of heat and pressure, the preferred process of reforming the pre-finished MDF board further comprises the step of remoisturizing the pre-finished MDF board after the step of applying pressure and heat. Such remoisturization can be achieved by applying water, steam, or the like to the reformed MDF board after the press-molding process. Such remoisturization advantageously prevents the type of gradual expansion of the reformed MDF board which would otherwise occur as the MDF board tries to return to its original moisture content of approximately 8%.

Also, the application of water, whether by spraying or otherwise, serves to cool the reformed MDF board after the heating and pressure application step. This, in turn, facilitates expedited stacking of the reformed MDF boards for subsequent storage and/or distribution.

Preferably, the pre-finished surface of the pre-finished MDF board is provided using a pre-finishing method which, in turn, is performed on a raw, flat MDF board (or substrate). The pre-finishing method comprises, for example, the steps of applying at least one pigment layer to at least one major surface of the raw MDF board, and thereafter applying at least one polymer top layer over the pigment layer(s). The polymer top layer(s) has (have) a release agent (e.g., in the form of inherent release properties of the top layer itself) which prevents it from adhering to the heated press mold during the application of pressure and heat.

If the pigment layer(s) cannot cover marks or color variations in the raw MDF board, the pre-finishing process may be modified to include application of at least one ground layer which serves as a primer prior to application of the pigment layer(s). The ground layer is applied to the major surface(s) of the raw MDF board. The pigment layer(s) then is (are) applied over the ground layer(s).

The ground layer, the pigment layer(s), and the polymer top layer(s) are applied using materials and thicknesses thereof which are capable of withstanding press-molding at temperatures and pressures sufficient to reform the ground layer, pigment layer(s) and polymer top layer(s), without cracking, bubbling, and adherence to a press mold, and to polymerize the top layer(s).

Preferably, the various layers which are applied during the pre-finishing method of the present invention are applied using a roll coater. The use of a roll coater is preferred because of its accuracy in applying a desired thickness of the coating(s). The desired thickness in most applications is actually very thin, because thin coatings tend to achieve a smudge-resistant state must faster than thicker coatings. Moreover, plural layers are preferred, in order to assure complete surface coverage which may not be achieved by use of a single coat.

Notably, it is the ability to pre-finish the MDF board before molding that facilitates the accurate use of a roll coater. Roll coating may not be effective or efficient after the board has been molded because recesses in the molded board hamper the roller coater's ability to provide a uniform coating. By applying the coating(s) while the MDF board remains flat, prior to molding, the present invention provides uniform contact between the roller and the flat surface being coated on the MDF board. Uniform application of the coating(s) with a desired thickness therefore becomes possible. While use of a roll coater is preferred because of its advantages, it is understood that alternative application techniques can be used, including but not limited to spraying, curtain coating, and the like.

The raw medium density fiber board preferably is about 0.125 inch thick, and the ground layer is applied to the raw medium density fiber board with a thickness of about 1 mil. Preferably, two pigment layers are applied, each having a thickness of about 1 mil, and two polymer top layers are applied, each top layer having a thickness of about 0.5 mil.

Alternatively, the ground layer can be eliminated, and three of the pigment layers can be applied, each with a thickness of about 0.3 mil (for a total thickness of all three pigment layers of about 0.9 mil), followed by a polymer top layer having a thickness of between 0.15 mil and 0.2 mil. The total thickness of the three pigment layers and the polymer top layer therefore remains very close to 1 to 1.2 mil. The ground layer, if applied, can consist of any commercially available primer material which is able to withstand the additional processing provided by the present invention.

An exemplary acrylic latex pigment layer is commercially available from Akzo Nobel Coatings, Inc of Clinton, Miss. under product number 610-WO29-182. The exemplary pigment layer advantageously is characterized as a white prepress sealer containing, among other ingredients, titanium dioxide, talc, hydrated aluminum silicate, a melamine formaldehyde resin, and a #2 butoxyethanol (ethylene glycol butyl ether). Alternatively, the pigment layer(s) can be applied so that a wood color and/or grain pattern are simulated by different colors or intensities thereof. Colors other than white or wood also can be used, with or without the use of grain patterns.

An exemplary acrylic latex polymer top layer(s) is commercially available from Akzo Nobel Coatings, Inc. of Clinton, Miss. under product number 610-WO29-180. The exemplary polymer top layer includes, among other ingredients, talc, hydrated aluminum silicate, titanium dioxide, a #2 butoxyethanol (ethylene glycol butyl ether), a melamine formaldehyde resin, and an N,N dimethyl ethanol amine. Alternatively, the polymer top layer can be provided using unfoamed versions of the materials disclosed in U.S. Pat. No. 5,616,419 to Hsu et al., the disclosure of which is incorporated herein by reference.

While the preferred application technique for the polymer top layer is rolling, it is understood that the invention is not limited to such application techniques. To the contrary, the polymer top layer(s) may be applied, for example, in the form of a crepe paper which carries a polymerizable resin and a release agent. When polymerized, the resin provides a vapor barrier which prevents moisture from passing through the top layer. Additionally, the layer(s) is (are) sufficiently hard when cured to withstand stacking, shipping, and handling without becoming unacceptably marred.

After the MDF board has been pre-finished, it can be stacked conveniently with other such boards. When a molded product is desired, the flat, pre-finished MDF board can be taken to the heated press mold and processed as indicated above to reform the pre-finished MDF board. The press mold preferably is heated to a temperature sufficiently high to soften the resin in the coating(s) and/or board, so that fibers in the board and the resin(s) in the coating(s) and board tend to flow rather than break during reforming of the pre-finished surface, but sufficiently low to prevent discoloration of the coating(s) and sticking of the coating(s) to the heated press mold.

When pre-finishing of the MDF board is provided using the foregoing method and coatings, the preferred temperature of the press mold is about 400° F. and the preferred pressure is about 1100 pounds per square inch. These temperature and pressure settings have been found to provide the best overall performance for use with the rated coatings, with the smallest likelihood of damaging the coating(s) and/or MDF board. Other temperature and pressure settings may be more useful with different coatings and/or different boards or thicknesses. The temperature should not be too low, or else the board and/or the coatings may crack. Likewise, it should not be too high, or else the board may become stuck in the mold or the finish may become discolored.

The process described above is particularly well-suited for use in inexpensively making reformed door skins from flat, pre-finished MDF boards. In this regard, the heated press mold is equipped with at least one relief surface and the step of applying pressure and heat is performed so that the relief surface reforms the pre-finished surface(s) with at least one ornamental feature. At least one of the die molds is oil heated to the desired elevated temperature.

The arrangement of the relief surface(s) preferably is provided so that the ornamental features include simulated door panels which are reformed to a depth no greater than 0.045 inch and/or simulated wood grain texturing no more than 0.045 inch deep. Preferably, the simulated wood grain texture has a shallower depth than the simulated door panels. While other ornamental features can be provided, the combination of simulated door panels and wood grain are quite popular and therefore constitute a preferred application of the present invention.

By simulating the wood panels and the grain using relatively shallow relief, the process of the present invention avoids damage to the pre-finished MDF board and the coating(s) thereon. There is no hazing, discoloring, cracking, bubbling, or inadvertent removal of the coating(s), nor is there any cracking or breaking of the fibers in the MDF board itself. Prior attempts to mold MDF boards to include simulated panels to a greater depth, by contrast, cannot be performed effectively on pre-finished MDF door skins, without causing at least one of the aforementioned defects.

The process preferably is carried out on an MDF board having an initial moisture content of about 6% to 7%. Since the reformed door skin will eventually be used as part of a door in a suitably sized door frame, it is important to minimize linear expansion of the MDF board over long periods of time. If the moisture content of the MDF board is not returned to its initial level prior to application of the door skin to a support frame, the gradual increase in moisture content which occurs naturally over time as the door skin absorbs moisture will cause the door to linearly expand and then buckle. The door then will become difficult to close and/or open. The process according to the present invention therefore preferably includes remoisturization of the reformed MDF board to a moisture content substantially equal to the MDF board's original moisture level, preferably, 6% to 7%.

Raw MDF boards having the desirable moisture content of 6% to 7% and minimal linear expansion are commercially available from Fibia Mold, an MDF board manufacturer in Chile, and Dominance, an MDF board manufacturer in Australia. The raw MDF boards preferably are provided with a thickness of about 0.125 inch±0.005 inch. Such boards can be made by pressing a dry mulch mat in a resin press. To achieve the desired MDF board thickness, the dry mulch mat is initially provided with a thickness of about one inch and is subsequently pressed by the resin press to a thickness of about 0.125 inch±0.005 inch.

A sufficiently stable wood for use in making the commercially available MDF boards is the South American Radiata Pine. MDF boards made with this particular type of pine had surprisingly good staining properties. They accepted, maintained/held, and exhibited the stain better than other MDF boards. Generally, it was found that MDF boards having small fibers are preferred over those having larger fibers, because the boards with smaller fibers are more compatible with wood stains.

When reforming pre-finished door skins, the heated press mold remains heated to a temperature sufficiently high to soften resin in the coating(s) so that fibers and resin in the board and resin in the coating(s) tend to flow rather than break during reforming of the pre-finished surface(s), and is sufficiently low to avoid sticking of the coating(s) to the heated press mold. In this regard, the heated press mold is heated to about 400° F. and the pressure applied to the pre-finished door skin by the press mold is about 1100 pounds per square inch.

Favorable results can be achieved when the heat and pressure are applied for only five seconds. Thus, if placement of the door skin on the press takes only five seconds and removal takes only five seconds, the entire process of reforming the door skin can be performed in about 15 seconds.

Because of the speed of the process attributable in part to the relative shallow depth achieved, efficient production can be performed easily using a single press. The single mold press preferably has opposed male and female sides, according to a preferred embodiment. Since the present invention can be practiced using a single mold press, there is no need for an expensive and complex multiple mold press.

Preferably, the pre-finishing process which provides the flat, pre-finished door skins includes the steps of applying a ground layer of 1 mil thickness onto a raw medium density fiber board; applying two pigment layers over the ground layer, each having a thickness of about 1 mil; and applying two polymer top layers over the pigment layers, each top layer having a thickness of about 0.5 mil. Preferably, the ground layer is dried in a flash oven after application and prior to application of the pigment layer(s). The top layer is polymerized after application, preferably in a gas-fired convection oven. The board and its coatings are then cooled.

FIG. 1 is a partial cross-section of an exemplary medium density fiber (MDF) board 10 which can be used as a starting material in the reforming process described above. The MDF board 10 preferably is a flat, pre-finished door skin having a thickness of 0.125 inch. The MDF board 10 is pre-finished in that it carries on one surface 12 thereof the ground layer 14 which serves as a primer, two pigment layers 16,18, and two protective top layers 20,22.

Each layer 14–22 preferably is applied using the materials and thicknesses described above in connection with the exemplary pre-finishing method. It is understood, however, that the present invention is not limited to use on MDF boards which carry all three types of layers (i.e., ground, pigment, and top), much less arrangements having the same thickness, number of layers, and/or specific compositions described herein. Other kinds of MDF pre-finishing which survive the pressing operation described above with no damage, or at least with a tolerable amount of damage for the particular application, can be used.

As indicated above, for example, the ground layer can be eliminated, and three of the pigment layers can be applied, each with a thickness of about 0.3 mil (for a total thickness of all three pigment layers of about 0.9 mil), followed by a polymer top layer having a thickness of between 0.15 mil and 0.2 mil. The resulting MDF board thus would be pre-finished in that it would carry on one surface thereof, three of the pigment layers 16 or 18, and one of the protective top layers 20 or 22.

Figure 2:
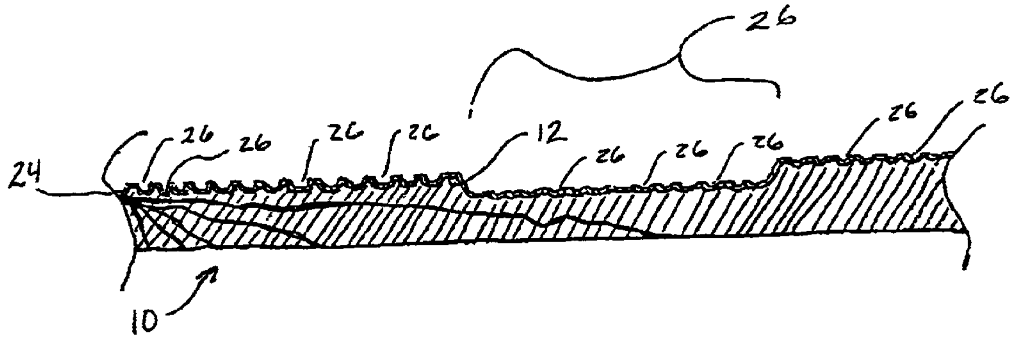
FIG. 2 is a fragmentary cross-sectional view of a pre-finished MDF board according to a preferred implementation of the present invention, after reformation.

FIG. 2 shows an exemplary pre-finished medium density fiber (MDF) board 10 after having been pre-finished and then processed using the above-described reformation process. The MDF board 10 has one pre-finished surface 12 which carries at least one coating 24 (e.g., consisting of the layers 14–22 shown in FIG. 1 or the combination of three pigment layers and one top layer described above). As a result of the reformation process, the pre-finished surface 12 and the coating(s) 24 are reformed by press-molding to provide relief features 26 which represent simulated door panels (only one of which is shown in FIG. 2) and shallower relief features 28 representing a wood grain texture (some of which have no reference numerals in order to avoid over-cluttering of the drawing). Some of the shallower relief features 28 appear within the deeper relief features 26. Preferably, the depth of the relief features 26 which represent the simulated door panels is no greater than 0.045 inch.

The reformed MDF board 10 preferably is re-moisturized, for example in the manner described above, so that the reformed MDF board 10 has a moisture content equal to or very close to the MDF board's original moisture content before heating and pressing, preferably about 6% to 7%.

Figure 3:
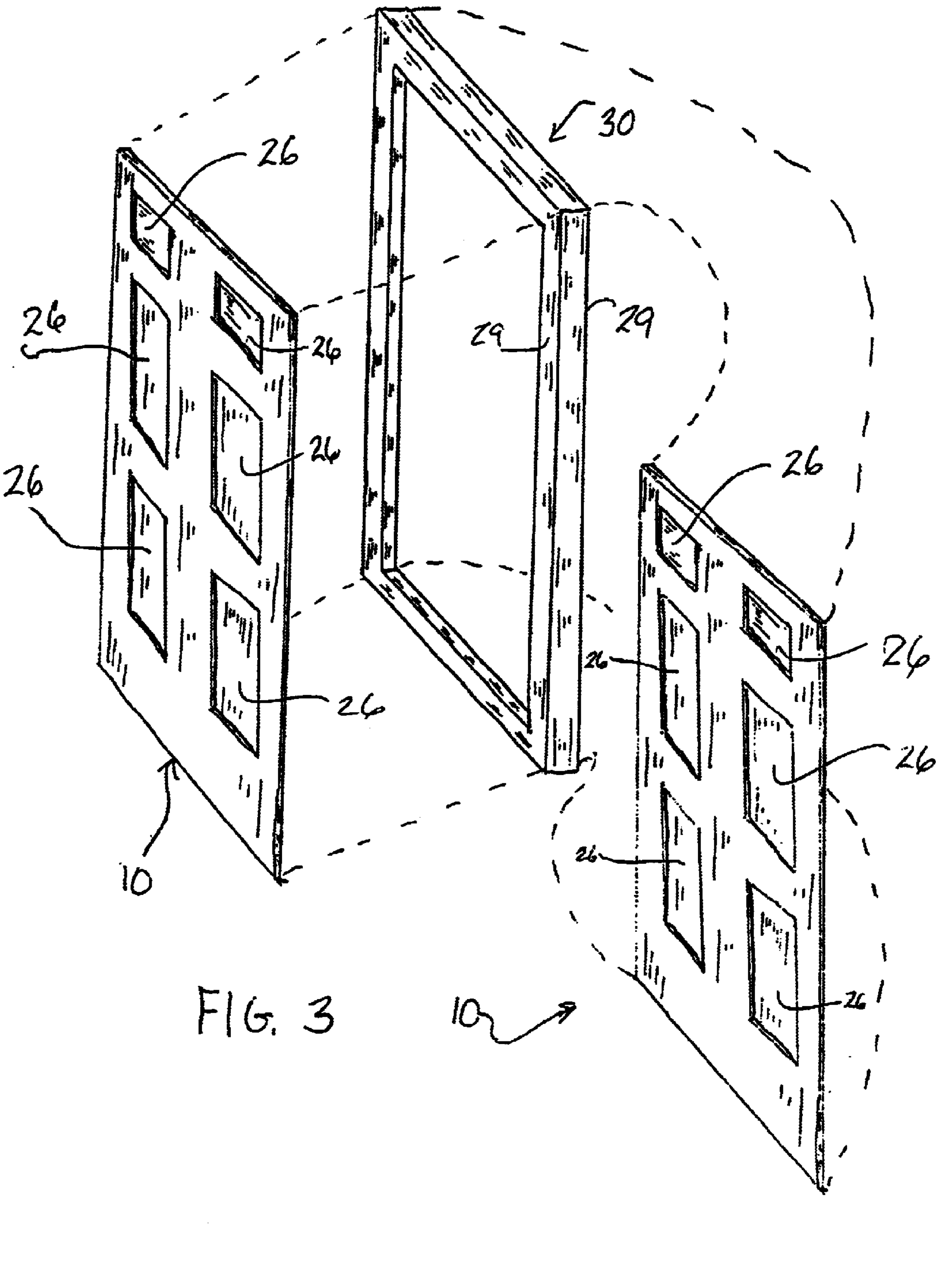
FIG. 3 is an exploded perspective view of a hollow-core door which is manufactured according to a preferred implementation of the present invention.

As shown in FIG. 3, two of the reformed MDF door skins 10 can be applied to opposite sides 29 of a support frame 30 to form a hollow-core door 32, using know techniques. While the panels 26 of the hollow-core door 32 are not as deep as panels in traditional wooden doors, they provide the overall appearance of a paneled wooden door, without the expense, disadvantages, and weight associated with traditional wooden doors. More importantly, this desirable overall appearance is provided using a reformation technique which is simpler, less expensive, and faster than conventional techniques for simulating such panels (e.g., using greater panel depths) and also is provided using equipment which is less complicated and consequently less expensive to implement and maintain than that which is required by such conventional techniques. The aesthetically pleasing appearance of paneled wood doors therefore becomes more economically accessible to owners and occupants of low cost housing and the manufactured housing industry.

While the term "pre-finished" has been used to describe an MDF board which requires no additional coatings after the reformation process, it is understood that the invention is not limited to such boards. To the contrary, the term "pre-finished MDF board" also encompasses MDF boards which are semi-finished and adapted to receive additional coatings. Examples of such semi-finished MDF boards are those which carry a basecoat, a printed wood grain pattern applied to the basecoat, and a transparent or translucent protective coat. The protective coat is applied over the printed wood grain pattern, is polymerizable, and is sufficiently porous after polymerization so as to be stainable or colorable by the end user at the installation site. This arrangement advantageously facilitates customization of the board's color by an end user after the board has been reformed using the inventive process. Despite the colorable and-stainable nature of such boards, they fall within the class of MDF boards which are referred to herein as "pre-finished". Examples of such "pre-finishing" techniques and the MDF boards produced thereby are disclosed in U.S. Pat. No. 5,597,620 to Martino, the disclosure of which is incorporated herein by reference.

Since the MDF boards can be finished (or semi-finished) prior to molding, the present invention facilitates certain conveniences and manufacturing efficiencies, including the use of coating techniques which are best suited for use on flat surfaces, such as the roll coating described above. It also facilitates the stocking of pre-finished flat MDF boards in inventory, and the rapid molding of such flat boards (e.g., within about 15 second) after orders are received without having to carry out a subsequent finishing process involving curing and/or drying.

While this invention has been described as having a preferred design, it is understood that the invention is not limited to the illustrated and described features. To the contrary, the invention is capable of further modifications, usages, and/or adaptations following the general principles of the invention and therefore includes such departures from the present disclosure as come within known or customary practice in the art to which the invention pertains, and as may be applied to the central features set forth above, and which fall within the scope of the appended claims.

What is claimed is:

1. A process for reforming a planar pre-finished medium density fiber (MDF) board, said process comprising the steps of:

applying at least one pigment layer over the medium density fiber board, applying at least one protective top layer over the at least one pigment layer to pre-finish at least one surface of the medium density fiber board, placing the planar pre-finished medium density fiber board in a heated press mold;

closing the heated press mold while the pre-finished medium density fiber board is located therein;

applying pressure and heat to the pre-finished medium density fiber board using said heated press mold so that said at least one pre-finished surface is reformed without cracking bubbling, or removal of said at least one coating;

opening the heated press mold; and removing the pre-finished medium density fiber board from the heated press mold.

2. The process of claim 1, wherein said heated press mold has at least one relief surface and wherein said step of applying pressure and heat is performed so that said at least one relief surface reforms at least a portion of said at least one pre-finished surface of the pre-finished medium density fiber board.

3. The process of claim 2, wherein said at least one relief surface is configured and said step of applying pressure and heat is performed so that said at least one pre-finished surface is reformed to a depth of no more than 0.045 inch in depth.

4. The process of claim 1, further comprising the application of at least one ground layer which serves as a primer.

5. The process of claim 1 wherein said at least one protective top layer includes a release agent which prevents said at least one protective top layer from adhering to the heated press mold during said step of applying heat and pressure.

6. The process of claim 1, further comprising the step of remoisturizing said pre-finished medium density fiber board after said step of applying pressure and heat to a predetermined moisture content.

7. The process of claim 1, wherein said heated press mold is heated to a temperature sufficient to soften resin in said at least one coating so that fibers and said resin tend to flow rather than break during reforming of said at least one pre-finished surface, and wherein said temperature is sufficiently low to prevent sticking of said at least one coating to the heated press mold.

8. The process of claim 7, wherein said heated press mold is heated to about 400° F. and said pressure is about 1100 pounds per square inch during said step of applying pressure and heat.

9. The process of claim 1, wherein said at least one pre-finished surface is provided using a pre-finishing method comprising the steps of:

applying a ground layer to at least one major surface of a raw medium density fiber board prior to applying the at least one pigmented layer and the at least one protective top layer;

said at least one protective top layer having a polymer composition, such that said at least one protective top layer is at least one polymer top layer, said at least one polymer top layer having a release agent which prevents said at least one polymer top layer from adhering to said heated press mold during said step of applying pressure and heat.

10. The process of claim 9, wherein: said raw medium density fiber board is about 0.125 inch thick;

said ground layer is applied to the raw medium density fiber board with a thickness of about 1 mil;

said at least one pigment layer comprises two pigment layers, each of the two pigment layers having a thickness of about 1 mil; and said at least one polymer top layer comprises two polymer top layers, each of the two 8 polymer top layers having a thickness of about 0.5 mil.

11. The process of claim 1, wherein said at least one protective top layer has a polymer composition, such that said at least one protective top layer is at least one polymer top layer, said at least one polymer top layer having a release agent which prevents said at least one polymer top layer from adhering to said heated press mold during said step of applying pressure and heat.

12. The process of claim 11, wherein:

said raw medium density fiber board is about 0.125 inch thick;

said at least one pigment layer comprises three pigment layers, each of the three pigment layers having a thickness of about 0.3 mil; and said at least one polymer top layer has a thickness of about 0.15 to 0.2 mil.

13. The process of claim 1, wherein:

said pre-finished medium density fiber board is a flat, pre-finished door skin; said heated press mold has at least one relief surface; and said step of applying pressure and heat is performed so that said at least one relief surface reforms said at least one pre-finished surface with at least one ornamental feature.

14. The process of claim 13, wherein said at least one relief surface is configured so that said at least one ornamental feature includes simulated door panels.

15. The process of claim 13, wherein said at least one relief surface is configured so that said at least one ornamental feature includes a simulated wood grain texture.

16. The process of claim 14, wherein said at least one relief surface is configured so that said at least one ornamental feature includes both a simulated wood grain texture and simulated door panels, and wherein said simulated wood grain texture is reformed to a shallower depth than said simulated door panels.

17. The process of claim 13, wherein said at least one relief surface is configured and said step of applying pressure and heat is performed so that reforming of said at least one pre-finished surface is no greater than 0.045 inch in dept.

18. The process of claim 13, further comprising the step of remoisturizing said pre-finished medium density fiber board after said step of applying pressure and heat, to replace moisture lost by said pre-finished medium density fiber board during said step of applying pressure and heat.

19. The process of claim 13, wherein said heated press mold is heated to a temperature sufficient to soften resin in said at least one coating so that fibers and said resin tend to flow rather than break during reforming of said at least one pre-finished surface, and wherein said temperature is sufficiently low to avoid sticking of said at least one coating to the heated press mold.

20. The process of claim 13, wherein said heated press mold is heated to about 400° F. and said pressure is about 1100 pounds per square inch during said step of applying pressure and heat.

21. The process of claim 13, wherein said at least one pre-finished surface is provided using a pre-finishing method comprising the steps of:

applying a ground layer to at least one major surface of a flat, raw medium density fiber board prior to applying the at least one pigmented layer and the at least one protective top layer;

said at least one protective top layer having a polymer composition, such that said at least one protective top layer is at least one polymer top layer, said at least one polymer top layer having a release agent which prevents said at least one polymer top layer from adhering to said heated press mold during said step of applying pressure and heat.

22. The process of claim 21, wherein:

said flat, raw medium density fiber board is about 0.125 inch thick;

said ground layer is applied to the raw medium density fiber board with a thickness of about 1 mil;

said at least one pigment layer comprises two pigment layers, each of the two pigment layers having a thickness of about 1 mil; and said at least one polymer top layer comprises two polymer top layers, each of the two polymer top layers having a thickness of about 0.5 mil.

23. The process of claim 13, wherein said at least one protective top layer having a polymer composition, such that said at least one protective top layer is at least one polymer top layer, said at least one polymer top layer having a release agent which prevents said at least one polymer top layer from adhering to said heated press mold during said step of applying pressure and heat.

24. A process for making a pre-finished medium density fiber (MDF) board which is reformable after finishing, said process comprising the steps of:

applying at least one pigment layer over at least one major surface of a planar raw medium density fiber board; and applying at least one polymer top layer over said at least one pigment layer, said at least one polymer top layer having a release agent which prevents said at least one polymer top layer from adhering to said heated press mold during press molding, wherein said at least one pigment layer and said at least one polymer top layer are applied using materials and thicknesses thereof which are capable of withstanding press-molding at temperatures and pressures sufficient to reform said at least one pigment layer and said at least one polymer layer, without cracking, bubbling, and adherence to a press mold.

25. The process of claim 24, wherein:

said raw medium density fiber board is about 0.125 inch thick;

said at least one pigment layer comprises three pigment layers, each of the three pigment layers having a thickness of about 0.3 mil; and said at least one polymer top layer has a thickness of about 0.15 to 0.2 mil.

26. The process of claim 24, wherein said at least one pigment layer and said at least one polymer top layer are applied using a rolling process.

27. The process of claim 23, wherein:

said flat, raw medium density fiber board is about 0.125 inch thick;

said at least one pigment layer comprises three pigment layers, each of the three pigment layers having a thickness of about 0.3 mil; and said at least one polymer top layer has a thickness of about 0.15 to 0.2 mil.

* * * * *